United States Patent
Ogita (10) Patent No.: US 10,380,216 B2
(45) Date of Patent: Aug. 13, 2019

(54) SERVER, CLIENT TERMINAL, SERVICE METHOD, AND PROGRAM

(71) Applicant: Rakuten, Inc., Tokyo (JP)

(72) Inventor: Takehiro Ogita, Tokyo (JP)

(73) Assignee: Rakuten, Inc., Tokyo (JP)

( * ) Notice: Subject to any disclaimer, the term of this patent is extended or adjusted under 35 U.S.C. 154(b) by 27 days.

(21) Appl. No.: 14/758,997

(22) PCT Filed: Jul. 8, 2013

(86) PCT No.: PCT/JP2013/068686
§ 371 (c)(1),
(2) Date: Jul. 2, 2015

(87) PCT Pub. No.: WO2015/004722
PCT Pub. Date: Jan. 15, 2015

(65) Prior Publication Data
US 2015/0347618 A1    Dec. 3, 2015

(51) Int. Cl.
*G06F 16/00* (2019.01)
*G06F 16/957* (2019.01)
(Continued)

(52) U.S. Cl.
CPC ........ *G06F 16/9577* (2019.01); *G06F 16/957* (2019.01); *G06F 16/986* (2019.01); *H04L 67/02* (2013.01)

(58) Field of Classification Search
CPC ............... G06F 17/30; G06F 17/30905; G06F 17/30899; G06F 16/9577; G06F 16/986; G06F 16/957; H04L 67/02
See application file for complete search history.

(56) References Cited

U.S. PATENT DOCUMENTS

2005/0229104 A1* 10/2005 Franco ................ G06F 9/44526
                                                    715/743
2007/0044085 A1*  2/2007 Stamper ............. G06F 9/44526
                                                    717/168
(Continued)

FOREIGN PATENT DOCUMENTS

JP        2001-125824 A    5/2001
JP        2002-007923 A    1/2002
(Continued)

OTHER PUBLICATIONS

International Search Report of PCT/JP2013/068686 dated Oct. 8, 2013 [PCT/ISA/210].

*Primary Examiner* — Stephen S Hong
*Assistant Examiner* — Marshon L Robinson
(74) *Attorney, Agent, or Firm* — Sughrue Mion, PLLC (57) ABSTRACT

In a server 101, a receiver 401 receives a request transmitted from a browser running on a client. A generator 402 generates a response including content according to the request. A transmitter 403 transmits the response to the browser. A determiner 404 determines from the request whether or not an add-on that executes a process in the browser is enabled in the browser. After determining that the add-on is disabled in the browser, content is generated so that a substitute element that executes the process in place of the add-on in the browser is displayed in a content area of the browser. After determining that the add-on is enabled in the browser, content is generated so that the substitute element is not displayed in the content area.

13 Claims, 7 Drawing Sheets

(51) Int. Cl.
*H04L 29/08* (2006.01)
*G06F 16/958* (2019.01)

(56) References Cited

U.S. PATENT DOCUMENTS

| | | | |
|---|---|---|---|
| 2010/0161586 A1* | 6/2010 | Safar | G06F 17/30991 707/707 |
| 2010/0198838 A1* | 8/2010 | Stamper | G06F 9/44526 707/748 |
| 2010/0299219 A1* | 11/2010 | Cortes | G06F 9/445 705/26.35 |
| 2011/0010553 A1 | 1/2011 | Cahn | |
| 2012/0054166 A1* | 3/2012 | Jeremias | G06F 17/30265 707/706 |
| 2012/0066666 A1* | 3/2012 | Ng | G06F 11/302 717/127 |

FOREIGN PATENT DOCUMENTS

| | | |
|---|---|---|
| JP | 2005-216215 A | 8/2005 |
| JP | 2007-048028 A | 2/2007 |
| JP | 2008-282295 A | 11/2008 |
| JP | 2012-533223 A | 12/2012 |

* cited by examiner

SERVER, CLIENT TERMINAL, SERVICE METHOD, AND PROGRAM

CROSS REFERENCE TO RELATED APPLICATIONS

This application is a National Stage of International Application No. PCT/JP2013/068686, filed Jul. 8, 2013, the contents of which are incorporated herein by reference in its entirety.

TECHNICAL FIELD

The present disclosure relates to a server, a client terminal, a service method, and a program that appropriately controls the availability as well as the visibility of a browser add-on that executes a process utilizing the server, and an element which is included in content provided from the server and which executes the process.

BACKGROUND ART

In the past, various Internet technologies for viewing various content have been proposed. With such Internet technologies, first, a user specifies desired content in a browser operating on a client. A request is then transmitted from the client to a server managing the content. Subsequently, a response including the content is transmitted from the server that received the request to the client. Finally, the desired content is displayed on a content area of the browser on the client.

As disclosed in Patent Literature 1, add-ons (also referred to as extensions, add-ins, or plug-ins) may be installed and added to a browser. An installed add-on is displayed in an add-on area of the browser (including a toolbar area, an address bar area, and a status bar area), and may accept input from the user or display various information.

Services made available using an add-on include the following, for example.

(a) Internet search. If a user inputs a query specifying a keyword or the like into an add-on, a server conducts a search, and a result is displayed in the content area.

(b) Site-specific search. Content managed by the same administrator as the content currently being displayed is searched.

(c) Store-specific search. On a server that realizes an electronic marketplace in which multiple stores participate, the product description page for a product satisfying a desired parameter is searched from among products sold by the store (seller) providing the product description page for the currently displayed product.

(d) Displaying various notifications for the user. A user name and password or a query specifying an already logged-in session ID or the like is periodically issued to a server, and information such as the number of new mails and unread messages, the number of points usable at an electronic marketplace, news headlines, weather reports, sale notifications, and advertisements and the like are displayed on the add-on area.

(e) A shopping cart at an electronic marketplace. The number of products that a user intends to purchase but has not paid for is displayed. If a mouse is moved over this add-on, a list of products in the shopping cart is displayed. If a product on the list is clicked, or if the add-on itself is clicked, payment content for purchasing products is displayed in the content area of the browser.

(f) Information about the content currently being displayed in the content area. Every time content is viewed with the browser, information such as certificate information, trust level information, or popularity information for the content is displayed in the add-on area.

Respective add-ons may be distributed separately, but in many cases multiple add-ons are provided as an integrated toolbar in order to bundle a series of services provided by a single server for easier usage. For example, a point display add-on, an advertising display add-on, and a shopping cart add-on may be available within a toolbar, such that points are accumulated at an electronic marketplace if a web search is conducted with a search add-on, usable points are displayed in the point display add-on, sales and campaign advertising that increase the point multiplier are displayed in the advertising add-on, and points are used to purchase products through the shopping cart add-on.

With individual add-ons, a program package storing such an add-on may be distributed, but a toolbar combining multiple add-ons may also be distributed as a single program package.

The latter format is typically configured so that, after installing the toolbar in the browser, the user is able to specify which add-ons available on the toolbar are to be enabled, and which add-ons are to be disabled, simply by checking items on a settings form of the toolbar.

Also, by using browser settings, it is also possible for the user to configure whether to enable or disable the toolbar itself.

In addition, a toolbar also works as a shared platform for each add-on. In other words, a toolbar is able to collectively execute and manage communication between each add-on in the toolbar, and a server. Also, in the case in which the toolbar itself is enabled, it is possible for the toolbar itself to operate autonomously and enable or disable each add-on in the toolbar.

Meanwhile, in content provided via the Internet it may also be possible to specify Hypertext Markup Language (HTML) elements that dynamically execute processes similar to the processes executed by the above add-ons. The position at which an HTML element is displayed may also be fixed at the top edge, bottom edge, left edge, right edge, or the like of the content area with Cascading Style Sheets (CSS) technology. Besides such HTML elements, various link elements and the like that are placed at the top edge of the content area are called a floating header.

In order to realize a floating header in the simplest way, it is sufficient to enclose a desired HTML element in a div element, and specify the placement style of the div element to "position: fixed; top: 0px; left: 0px; width: 100%" or the like.

In a process that executes such an HTML element, in order to query a server, a programming language such as JavaScript (registered trademark) may be used, and web application technology called AJAX (Asynchronous JavaScript and XML) may also be utilized. Note that the use of AJAX is possible even in the case of adopting another programming language in order to develop an add-on or toolbar.

If a client issues some kind of request to a server, the server responds with content answering the request, even in the case in which the user inputs a Universal Resource Locator (URL) of desired content, and even in the case in which an add-on, HTML element, or script utilizes the server. Besides being content that is displayed in the content area of the browser and directly viewed by the user, the content sent in response at this point is often structured data.

Structured data is often not expected to be directly viewed by the user, but rather processed by a program and then presented to the user.

CITATION LIST

Patent Literature

Patent Literature 1: Unexamined Japanese Patent Application Publication (Translation of PCT Application) No. 2012-533223

SUMMARY OF INVENTION

Technical Problem

In a browser, an add-on may exist in various potential conditions. An add-on may be installed and enabled, installed but disabled, or not installed.

Consequently, in order to provide a service as described above to a user, it is necessary to cause an HTML element displayed in the content area of the browser execute a process as described above. In other words, the server is required to provide content that includes HTML elements that execute various processes with the browser.

Meanwhile, in the case in which a browser with an installed and enabled add-on displays the above content, the same process is executed by both the HTML element and the add-on, and there is a risk of confusing the user or making the layout of the overall browser screen seem complicated when prompting for user input or displaying information for the user.

The present disclosure attempts to solve problems like the above, and takes as an object to provide a server, a client terminal, a service method, and a program that appropriately controls the availability as well as the visibility of a browser add-on that executes a process utilizing a server, and an element which is included in content provided from the server and which executes the process.

Solution to Problem

A server according to a first aspect of the present disclosure includes:

a receiver that receives a request transmitted from a browser running on a client;

a generator that generates a response including content according to the received request;

a transmitter that transmits the generated response to the browser; and a determiner that determines from the received request whether an add-on that executes a process in the browser is enabled or disabled in the browser;

wherein after determining that the add-on is disabled in the browser, the generator generates the content so that a substitute element that executes the process in place of the add-on in the browser is displayed in a content area of the browser, and after determining that the add-on is enabled in the browser, the generator generates the content so that the substitute element is not displayed in the content area.

Also, a server of the present disclosure may also be configured such that by execution of the process, the browser receives a query from a user of the browser, transmits a request including the query to the server, receives a response including a search result for the query from the server, and displays the search result in the content area of the browser, during execution of the process by the substitute element, the query is received from an input area of the substitute element placed in the content area, and during execution of the process by the add-on, the query is received from an input area of the add-on placed in an add-on area of the browser.

Also, a server of the present disclosure may also be configured such that the server provides content related to an electronic marketplace that a plurality of stores participate in, during execution of the process by the substitute element, specifying a query taking the search range to be a store providing the content being displayed in the content area is possible, and during execution of the process by the add-on, specifying a query taking the search range to be the store providing the content being displayed in the content area, as well as specifying a query taking the search range to be a store that compete with the store providing the content being displayed in the content area, are possible.

Also, a server of the present disclosure may also be configured such that by execution of the process, the browser intermittently transmits a request including identification information that identifies a user of the browser, receives a response including user information related to the identification information from the server, and displays the user information, during execution of the process by the substitute element, the user information is displayed in a display area of the substitute element placed in the content area of the browser, and during execution of the substitute process by the add-on, the user information is displayed in a display area of the add-on placed in an add-on area of the browser.

Also, a server of the present disclosure may also be configured such that a plurality of processes are executable in the browser, each of the plurality of processes is executed by each of a plurality of add-ons as well as each of a plurality of substitute elements that act in place of the plurality of add-ons, among the plurality of add-ons, an add-on enabled in the browser is displayed grouped in an add-on area of the browser, and among the plurality of elements, a substitute element that acts in place of an add-on disabled in the browser is displayed grouped at a designated position in the content area.

Also, a server of the present disclosure may also be configured such that when the plurality of add-ons includes an add-on that is enabled in the browser and an add-on that is disabled in the browser, by instruction of the user, a setting element that set the add-on to enable a disabled add-on in the browser is grouped together with a substitute element that acts in place of an add-on that is disabled in the browser.

Also, a server of the present disclosure may also be configured such that the determiner determines that the add-on is enabled in the browser if the add-on is specified as request source information in the received request.

A client according to a second aspect of the present disclosure is a client running a browser having an enabled add-on that executes a process using a server, including:

an acceptor that accepts content transmitted from the server; and a display that displays the content in a content area of the browser;

wherein if a substitute element that executes the process in place of the add-on is included in the received content, the add-on deletes or hides the substitute element.

Also, a client of the present disclosure may be configured such that, in a case where the add-on is operably installed in the browser but is set to be disabled, when the content is received from the server, the add-on is set to be enabled, and when other content is received from other server, the add-on is disabled again.

Also, a client of the present disclosure may be configured such that, in a case where a plurality of add-ons are installed in the browser, but include an add-on that is set to be enabled and an add-on that is set to be disabled, if an amount of content other than the substitute element that is displayable in the content area when the disabled add-on is set to be enabled and the substitute element is not displayed is equal to or greater than an amount of content other than the substitute element that is displayable in the content area when the disabled add-on is disabled and the substitute element is displayed, the disabled add-on is set to be enabled in the browser.

Also, a client of the present disclosure may be configured such that, in a case where a plurality of add-ons are installed in the browser, but include an add-on that is set to be enabled and an add-on that is set to be disabled, if an amount of content other than the substitute element that is displayable in the content area when the enabled add-on is disabled and the substitute element is displayed is equal to or greater than an amount of content other than the substitute element that is displayable in the content area when the enabled add-on is enabled and the substitute element is not displayed, the enabled add-on is set to be disabled in the browser.

A service method according to a third aspect of the present disclosure includes:

a receiving step that receives a request transmitted from a browser running on a client;

a generating step that generates a response including content according to the received request;

a transmitting step that transmits the generated response to the browser; and a determining step that determines from the received request whether an add-on that executes a process in the browser is enabled or disabled in the browser;

wherein after determining that the add-on is disabled in the browser, the generating step generates the content so that a substitute element that executes the process in place of the add-on in the browser is displayed in a content area of the browser, and after determining that the add-on is enabled in the browser, the generating step generates the content so that the substitute element is not displayed in the content area.

A program according to a fourth aspect of the present disclosure causes a computer to function as:

a receiver that receives a request transmitted from a browser running on a client;

a generator that generates a response including content according to the received request;

a transmitter that transmits the generated response to the browser; and a determiner that determines from the received request whether an add-on that executes a process in the browser is enabled or disabled in the browser;

wherein after determining that the add-on is disabled in the browser, the generator generates the content so that a substitute element that executes the process in place of the add-on in the browser is displayed in a content area of the browser, and after determining that the add-on is enabled in the browser, the generator generates the content so that the substitute element is not displayed in the content area.

Additionally, a program according to the present disclosure may be recorded onto a non-transitory computer-readable information recording medium, such as a Compact Disc, a flexible disk, a hard disk, a magneto-optical disc, a Digital Video Disc, magnetic tape, or semiconductor memory and the like. This information recording medium may be distributed or sold independently of the computer.

Furthermore, the above program may be distributed or sold via a transmission medium such as a computer communication network, independently of the computer on which the program is executed.

Advantageous Effects of Invention

According to the present disclosure, it is possible to provide a server, a client terminal, a service method, and a program that appropriately controls the availability as well as the visibility of a browser add-on that executes a process utilizing a server, and an element which is included in content provided from the server and which executes the process.

BRIEF DESCRIPTION OF DRAWINGS

FIG. 2A is an explanatory diagram illustrating a conventional example of content including a substitute element being displayed in a content area of a browser with an installed add-on;

FIG. 2B is an explanatory diagram illustrating a conventional example of content including a substitute element being displayed in a content area of a browser with an installed add-on;

FIG. 3A is an explanatory diagram illustrating a display example according to the present embodiment in which content is displayed in a content area of a browser with an installed add-on;

FIG. 3B is an explanatory diagram illustrating a display example according to the present embodiment in which content is displayed in a content area of a browser with an installed add-on;

FIG. 7 is a flowchart illustrating a control flow of a client process executed by a client running a browser with an enabled add-on.

DESCRIPTION OF EMBODIMENTS

Hereinafter, embodiments of the present disclosure will be described. Note that the embodiments are for the purpose of explanation, and do not restrict the scope of the present disclosure. Consequently, although a person ordinarily skilled in the art may be able to adopt embodiments in which some or all of these elements have been substituted with their equivalents, such embodiments are also included in the scope of the present disclosure.

Embodiment 1

Figure 1:
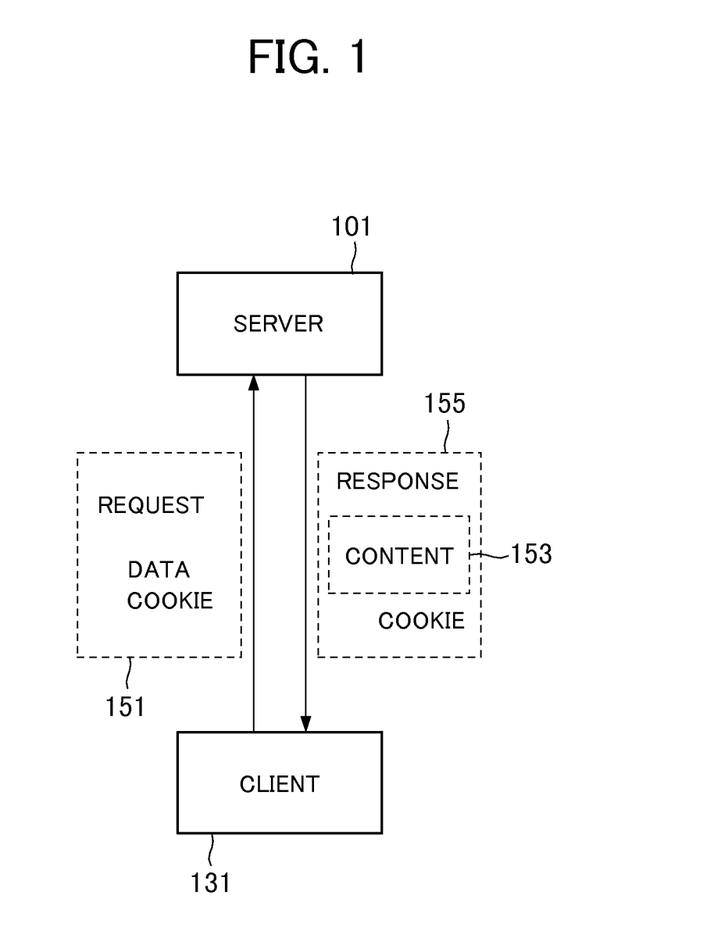
FIG. 1 is an explanatory diagram illustrating an overall configuration of a server and a client.

FIG. 1 is an explanatory diagram illustrating an overall configuration of a server and a client terminal according to the Embodiment. The description hereinafter will refer to this diagram.

As illustrated in the diagram, a server 101 and a client 131 communicate via the Internet.

Herein, in the present embodiment, the server 101 and the client 131 are realized by executing a server program and a client program on various computers.

Typically, a computer is controlled by a central processing unit (CPU).

A CPU loads or maps a program stored in read-only memory (ROM), electrically erasable programmable ROM (EEPROM), a solid-state drive (SSD), a hard disk, or the like into random access memory (RAM), and then reads, interprets, and executes the program.

During execution of a program, the RAM is also used as a storage area for temporarily saving data.

When permanently or non-transitorily saving data is obtained by conducting various processes, electrical erasable programmable ROM (EEPROM), a solid-state drive (SSD), a hard disk, or the like is used.

Also, the computer accepts input from a user via a keyboard and mouse, a touch panel, or keys and buttons, and displays process results on a liquid crystal display or a cathode ray tube (CRT).

Besides the above, the computer communicates with another computer via a network interface card (NIC) or the like. In the case of the computer being used remotely by a user using another computer, input from the user and output to the user are carried out via the NIC or the like.

Meanwhile, in the present embodiment, the client 131 transmits a request 151 to the server 101. Upon receiving the request 151, the server 101 generates content 153 according to the request 151, and transmits a response 155 including the content 153 to the client 131. Upon receiving the response 155, the client 131 displays the content 153 included in the response 155 in the content area of a browser, or subjects the content 153 to a process by an add-on or substitute element.

The most typical triggers by which a request 151 from the browser of the client 131 is transmitted to the server 101 are the case of the user inputting a URL into the address bar of the browser, and the case of the user selecting an included link.

Otherwise, an add-on installed in the browser of the client 131, or a toolbar that includes such an add-on, may transmit the request 151 to the server 101 when triggered by user input, an idle period, or the like, or periodically.

Furthermore, a substitute element displayed in a content area of the browser of the client 131 may also transmit the request 151 to the server 101 when triggered by user input, an idle period, or the like, or periodically. As a general rule, transmission of the request 151 by a substitute element involves a JavaScript function associated with the substitute element executing a call. However, with a substitute element realized by a form element, since transmission of the request 151 is possible with a submit element included in the form element, a JavaScript function call is not required.

As above, an add-on and a substitute element execute substantially the same process, and transmit the request 151 to the server 101 according to input from the user, an event produced periodically or during an idle period, or the like. After the client 131 receives the response 155 transmitted from the server 101 according to the request 151, depending on the type of process, the content 153 included in the response 155 may be displayed in the content area of the browser, or used as raw material for the add-on or substitute element to present information.

Content 153 displayed in the content area of the browser is usually in HTML format, JPG format, or GIF format, but content 153 that acts as raw material for the add-on or substitute element to present information may adopt various formats besides the HTML format, such as the XML format, the JSON format, or the SOAP format.

Generally, the GET or POST method in the Hypertext Transfer Protocol (HTTP) is utilized to transmit the request 151 in either of the above cases.

With the GET method, various information such as the type of desired information and location as well as information identifying the user is inserted into the URL accompanying the request 151 and transmitted. On the other hand, with the POST method, various information is collectively transmitted separately from the URL.

When transmitting the request 151 to the server 101, it is typical to add a cookie included in a response received earlier from the server 101.

For example, consider a situation in which user authentication is required to use the server 101. When the user uses the server 101 from the client 131 for the first time, the user inputs his or her own user ID and password into the browser.

Subsequently, the browser transmits the user ID and password to the server 101 with the POST method (or GET method).

After the user's user ID and password are authenticated on the server 101, the server 101 issues a session ID with a validity period to the user, and specifies a cookie including this session ID in the response 155 together with the content 153.

Upon receiving the response 155, the browser of the client 131 saves the cookie included in the response 155, and specifies the saved cookie when transmitting a new request 151 to the server 101.

Since the session ID included in the cookie specified in the request 151 is issued to a previously authenticated user, if still within the validity period, the server 101 transmits the response 155 to the client 131 with respect to the request 151 as though authentication was successful.

At this point, the validity period of the session ID may be extended, or a new session ID may be issued and stored in the cookie, and then the response 155 including the cookie and the content 153 may be transmitted to the client 131.

Consequently, for the second and subsequent requests after a user has already finished authentication once, the user is not required to input the user ID and password.

Cookies are managed by the browser per domain of the server 101 (per host name of the server 101). The add-on and the substitute element access the same server 101, and thus may share a cookie.

Figure 2A:
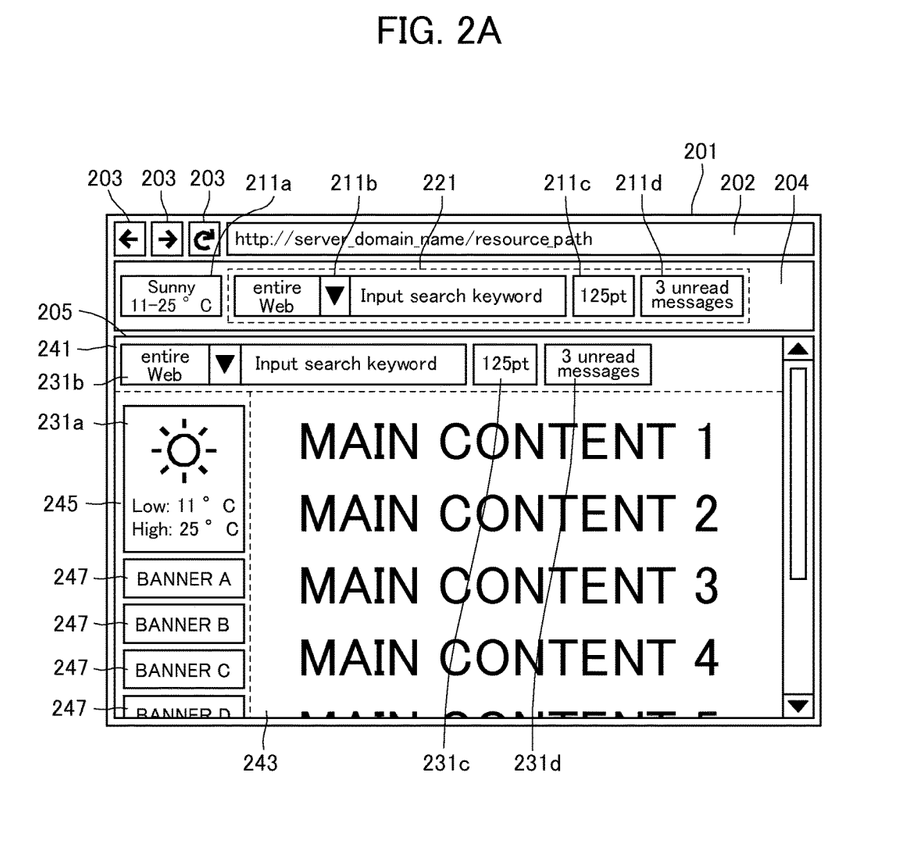
Figure 2B:
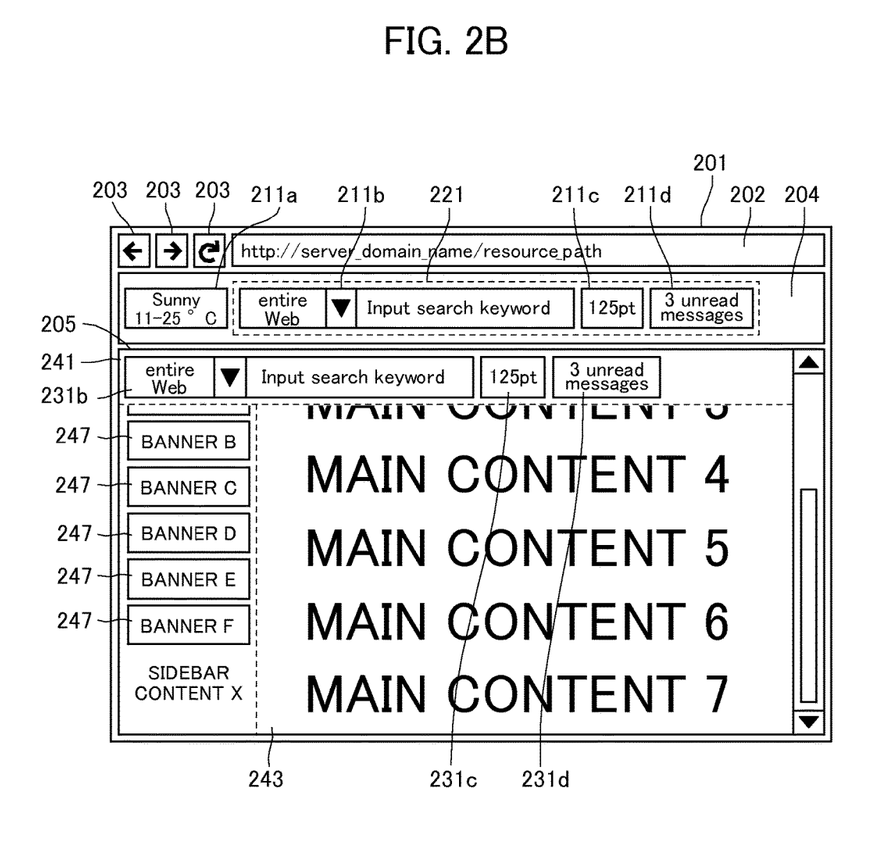

FIGS. 2A and 2B are explanatory diagrams illustrating a conventional example of content 153 including a substitute element being displayed in a content area of a browser with an installed add-on. The description hereinafter will refer to these diagrams.

As illustrated in the diagrams, on a browser screen 201, an address bar area 202, buttons 203, and a toolbar area 204 are available in addition to a content area 205 with a scrollbar. Besides the above, a status bar area not illustrated may also be available at the bottom edge of the browser screen.

If the user inputs a URL of desired content 153 into the address bar area 202, the content 153 is displayed in the content area 205.

The buttons 203 are used to move backward or forwards through a history of content 153 displayed in the content area 205, and to reacquire the content 153 currently being displayed in the content area 205.

The toolbar area 204 is an area in which is placed an add-on that extends the functionality of the browser, or a combined toolbar that groups multiple add-ons. In the diagrams, a weather report add-on 211a is directly placed in the toolbar area 204. Additionally, a search add-on 211b, a points display add-on 211c, and a message display add-on 211d are available on a toolbar 221 placed in the toolbar area 204. Hereinafter, when collectively referring to the add-ons 211a to 211d as well as corresponding add-ons, the subscripts a to d in the reference signs will be omitted.

Meanwhile, in the conventional example illustrated in the diagrams, content 153 obtained from a server 101 that provides the add-ons 211 and the toolbar 221 is being displayed in the content area 205.

In the content 153 displayed in the content area 205, a weather report substitute element 231a, a search substitute element 231b, a points display substitute element 231c, and a message display substitute element 231d are placed as substitute elements that perform processes similar to the add-ons 211a to 211d. When collectively referring to these substitute elements 231a to 231d, the subscripts to likewise will be omitted, and the substitute elements will be denoted as the substitute elements 231.

The search substitute element 231b, the points display substitute element 231c, and the message display substitute element 231d are placed grouped within a floating header 241 fixed to the top edge of the content area 205. Consequently, as illustrated in FIG. 2B, even when the user scrolls the content area 205, the floating header 241 remains stationary at the top edge of the content area 205, and the user is able to continuously view the substitute elements 231b, 231c, and 231d.

On the other hand, the weather report substitute element 231a is placed within a sidebar 245 available along the side of main content 243 among the content 153. Within the sidebar 245, banner ads 247 or the like are placed besides the weather report substitute element 231a.

If the user scrolls the content area 205, the sidebar 245 is also scrolled. Consequently, depending on the amount of scrolling, the user may become unable to see the weather report substitute element 231a, as illustrated in FIG. 2B.

The search substitute element 231b is made up of a form element or the like that accepts user instructions and input, while the substitute elements 231b, 231c, and 231d are made up of span elements or the like whose displayed content is overwritten depending on the operation of a JavaScript function. The floating header 241 is made up of a div element or the like that internally includes the substitute elements 231b, 231c, and 231d.

As the conventional example illustrated in these diagrams demonstrates, on the browser screen, the respective add-ons 211 and the respective substitute elements 231 execute similar processes, and provide the same services to the user. For this reason, the user may feel annoyed. Also, since the substitute element 231a as well as the floating header 241 that includes the substitute elements 231b to 231d are placed within the content area 205, there is a decrease in the amount of content 153 that the user is able to view on a single screen without scrolling, such as the main content 243 and the banner ads 247 displayed together within the content area 205.

The server 101 and the client 131 according to the present embodiment solve these problems by appropriately controlling the display of the add-ons 211 and the substitute elements 231.

Figure 3A:
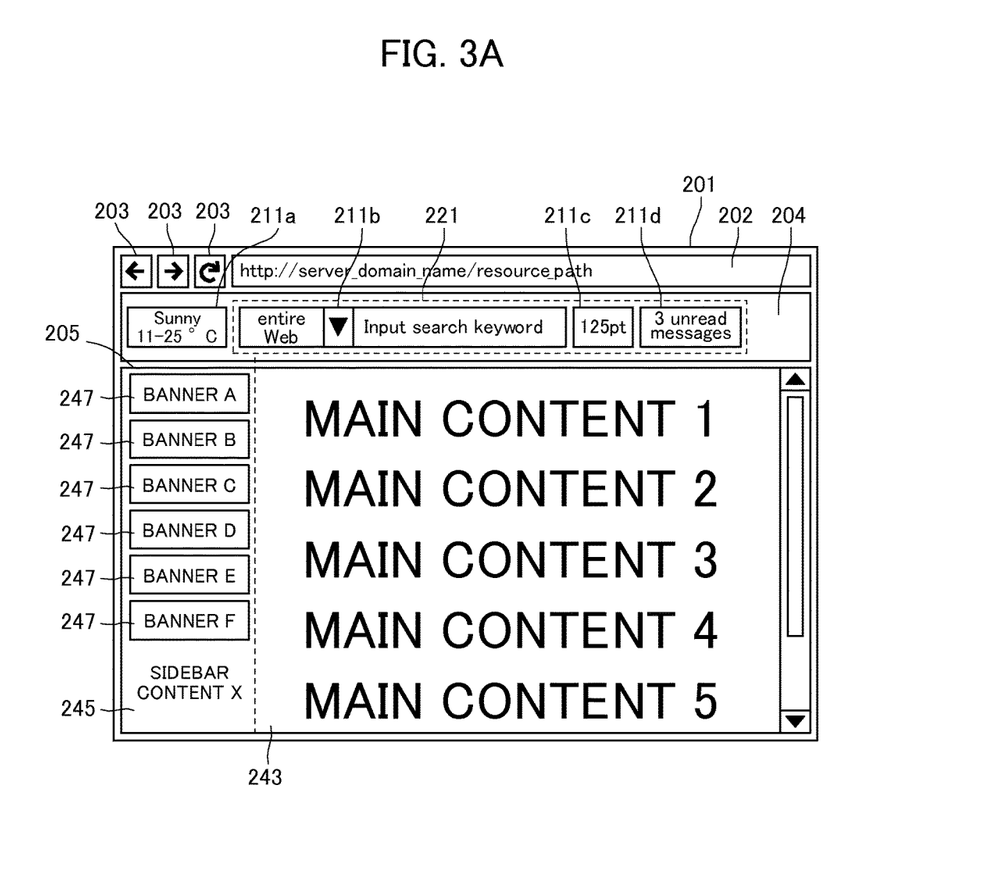
Figure 3B:
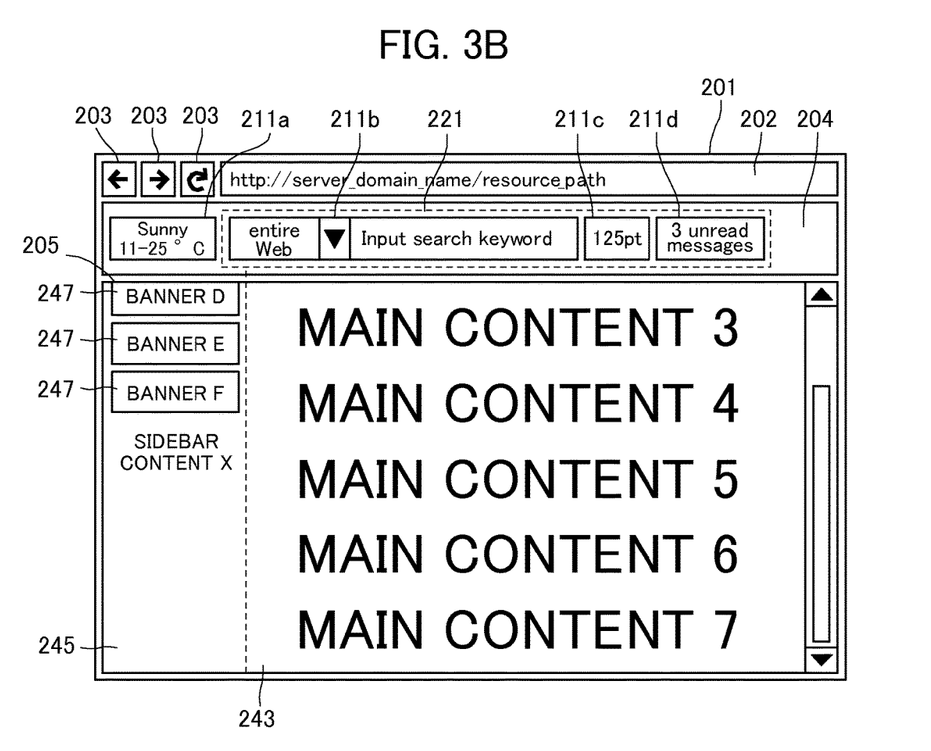

FIGS. 3A and 3B are explanatory diagrams illustrating a display example according to the present embodiment in which content 153 is displayed in a content area 205 of a browser with an installed add-on. The description hereinafter will refer to these diagrams.

Unlike the conventional example illustrated in FIGS. 2A and 2B, on the browser screen 201 illustrated in FIGS. 3A and 3B, the substitute element 231a and the floating header 241 are not displayed in the content area 205. For this reason, the amount of main content 243 and banner ads 247 that may be displayed is increased.

In other words, the area in which to display the main content 243 and the sidebar 245 increases by an amount equal to the removal of the floating header 241. Also, within the sidebar 245, the area in which to display the banner ads 247 likewise increases by an amount equal to the removal of the substitute element 231a.

For this reason, the user becomes able to focus on the content 153 itself without feeling annoyed by exchanges of information conducted in multiple places. In addition, the user becomes able to grow accustomed to specific exchanges of information via the toolbar area 204.

Meanwhile, the following hiding control techniques are conceivable in order to not display the substitute elements 231.

(1) In the case in which the add-ons 211 are being used by the browser, the server 101 generates content 153 that do not include the substitute elements 231.

(2) In the server 101 or the client 131, within the CSS of the content 153, the display attribute of the substitute elements 231 is set to none, and the JavaScript function associated with the substitute elements 231 of the content 153 is changed to not process anything.

(3) The substitute elements 231 are deleted from the already-generated content 153 itself at the client 131.

On the client 131 side, each add-on 211 or the toolbar 221 is able to execute the above techniques (2) and (3) on the basis of an instruction based on a judgment result from the server 101, or autonomous operation.

Besides the above, the above techniques (2) and (3) may also be executed by a JavaScript function associated with each substitute element 231. In other words, after a request 151 is sent to the server 101 from each substitute element 231 by first executing such a JavaScript function, if the add-on 211 corresponding to that substitute element 231 is usable at the client 131, the server 101 generates a response 155 that includes an instruction to hide that substitute element 231, transmits the response 155 to the substitute element 231, and the substitute element 231 executes the above techniques (2) and (3) on the basis of the instruction included in the response 155.

Note that the add-ons 211 and the substitute elements 231 of the present Embodiment may be modified as appropriate in order to provide other services to the user.

Hereinafter, first, a specific configuration of the server 101 will be described, and then a specific configuration of the client 131 will be described.

Figure 4:
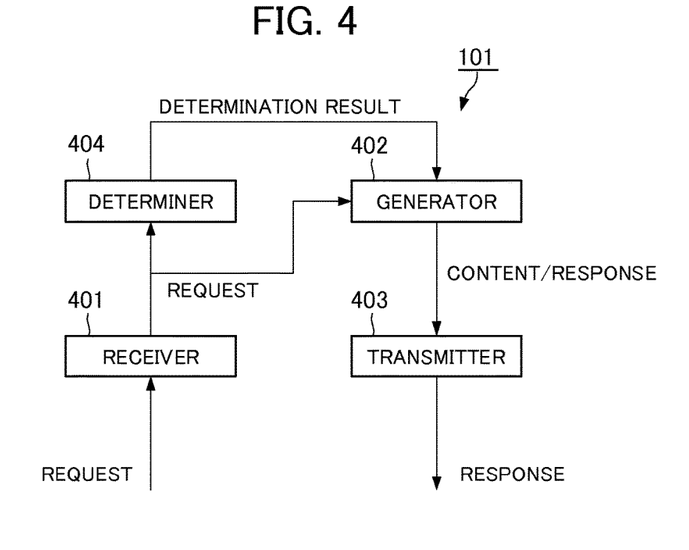
FIG. 4 is an explanatory diagram illustrating an overall configuration of a server.
Figure 5:
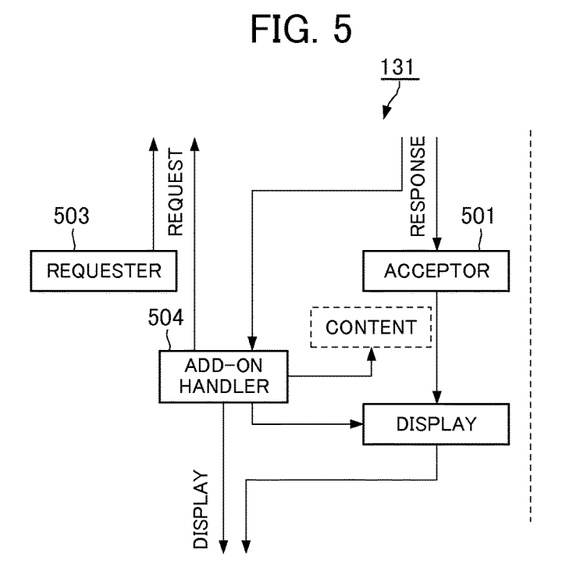
FIG. 5 is an explanatory diagram illustrating an overall configuration of a client running a browser.

FIG. 4 is an explanatory diagram illustrating an overall configuration of the server 101. The server 101 in the present Embodiment is realized by executing a server program on a server computer. FIG. 5 is an explanatory diagram illustrating an overall configuration of the client 131 running a browser. The client 131 in the present Embodiment is realized by executing a client program that realizes a browser as well as an add-on program for the client program on a client computer. Hereinafter, the description will refer to these diagrams.

The server 101 according to the present embodiment is equipped with a receiver 401, a generator 402, and a transmitter 403. Also, a determiner 404 is provided as an element that may be omitted depending on the embodiment.

On the other hand, the client 131 is equipped with an acceptor 501, a display 502, and a requester 503. In addition, in the case in which an add-on is installed and enabled in a browser running on the client 131, an add-on handler 504 is additionally provided.

Herein, the requester 503 of the client 131 transmits a request 151 to the server 101, due to the user inputting a URL, selecting a link, or the like.

Subsequently, the receiver 401 of the server 101 receives the request 151 transmitted from the browser running on the client 131.

At this point, the generator 402 of the server 101 generates a response 155 that includes content 153 according to the received request 151.

Furthermore, the transmitter 403 of the server 101 transmits the generated response 155 to the browser of the client 131.

The acceptor 501 of the client 131 subsequently accepts the response 155 that includes content 153 transmitted from the server 101 according to the request 151.

The display 502 of the client 131 then displays the content 153 included in the received response 155 in the content area 205 of the browser.

Meanwhile, the add-on handler 504 of the client 131 transmits a request 151 related to the function of the add-on to the server 101.

Subsequently, the generator 402 and the transmitter 403 of the server 101 work in the same way as above, and a response 155 related to the function of the add-on is transmitted from the server 101, and thus the add-on handler 504 of the client 131 receives the response 155.

The content 153 included in the received response 155 may be displayed directly in the content area 205 of the browser, as with the weather report add-on 211a or the like, or displayed on an add-on placed in the toolbar area 204 of the browser, as with the points display add-on 211c or the like.

The above functionality is similar to a conventional webserver and a client running a browser with installable add-ons.

In the present embodiment, the enabling/disabling of the add-ons 211 as well as the displaying/hiding of the substitute elements 231 are controlled by a configuration like the following.

The first technique is a control technique that provides the server 101 with a determiner 404, so that the server 101 makes a determination.

In other words, the determiner 404 determines, from the request 151, whether an add-on that executes a process in the browser is enabled or disabled in the browser.

In order to make this determination, the add-on handler 504 of the client 131 embeds its own name or identification information that identifies a process executed by the add-on handler 504 itself into the request 151 issued by the add-on handler 504 itself.

Specifically, this determination is made possible insofar as the format of a URL requested by the add-on handler 504 differs from the format of a URL requested by the requester 503. Otherwise, in the case in which the add-on handler 504 uses the PUT method to transmit a request 151 to the server 101, the name or the like of the add-on may be specified within the associated data.

Otherwise, with the toolbar 221 that combines multiple add-ons 211, the determination by the determiner 404 becomes possible if a request 151 specifying which add-ons 211 are enabled and which add-ons 211 are disabled is periodically or intermittently transmitted to the server 101.

Upon confirming from the determination result that the substitute elements 231 are to be hidden, if the server 101 adopts any of the hiding control techniques (1), (2), or (3) described above, the substitute elements 231 become invisible when displaying the content 153 in a content area 244 on the client 131.

Note that with the configuration in which the add-ons 211 or the toolbar 221 periodically or intermittently sends a request 151 to a server, it is sufficient to determine that the add-ons 211 are enabled until a fixed period of time, typically a period that is a multiple of a given cycle, elapses after receiving the request 151.

Also, with the configuration that sends a request 151 to a server on the basis of a user instruction, as with the search add-on 211b, the add-on may be determined to be enabled for a subsequent fixed period, typically lasting from several hours to several days.

Figure 6:
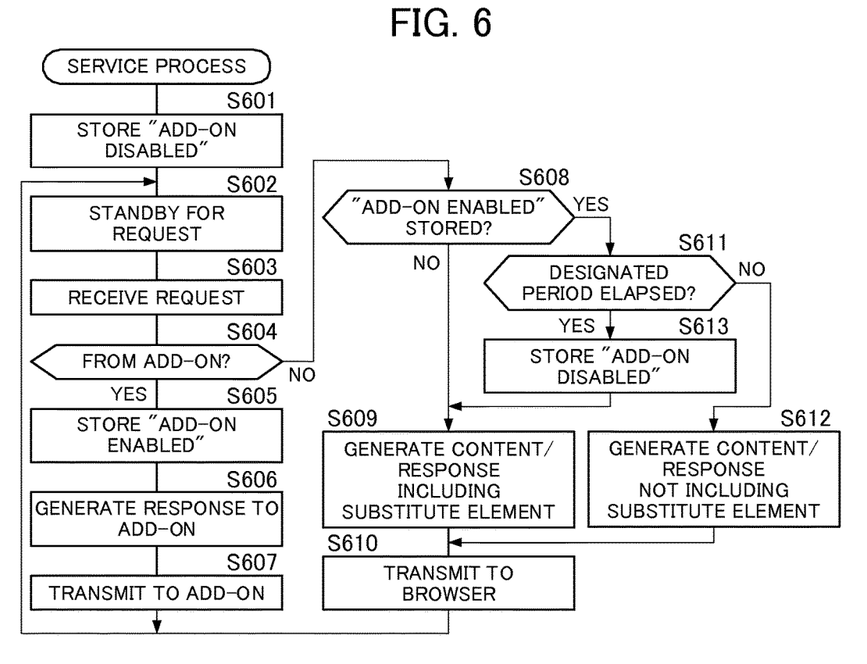
FIG. 6 is a flowchart illustrating a control flow of a service process executed by a server.

FIG. 6 is a flowchart illustrating a control flow of a server process executed by the server 101 according to an example of the present technique. The description hereinafter will refer to this diagram. Note that although the following description presupposes a single add-on 211 and corresponding substitute element 231 for the sake of simplicity, a similar process is possible even in the case of multiple add-ons 211, or in the case of using a toolbar 221.

First, the server 101 initializes the RAM, and stores an indication that the add-on 211 is disabled in the browser on the client 131 (step S601).

The server 101 stands by for a request 151 transmitted from the client 131 (step S602). If the receiver 401 receives a request 151 (step S603), the determiner 404 determines whether or not that request 151 was issued by an add-on 211 installed and enabled in the browser on the client 131 (step S604).

If the add-on 211 issues the request 151 (step S604; Yes), information indicating that the add-on 211 is enabled in the browser on the client 131 is stored in the RAM (step S605), the generator 402 generates content 153 expressing a response to the add-on 211 (step S606), the content 153 is transmitted to the add-on 211 of the browser on the client 131 (step S607), and the process returns to step S602.

On the other hand, if something other than the add-on 211 issues the request 151 (step S604; No), the generator 402 of the server 101 determines whether or not the add-on 211 is stored as "enabled" in the browser on the client 131 (step S608).

If stored as "disabled" (step S608; No), the generator 402 generates a response including content that includes a substitute element 231 in place of the add-on 211 (step S609), the transmitter 403 transmits the generated content to the browser of the client 131 in reply (step S610), and the process returns to step S602.

On the other hand, if the add-on 211 in the browser on the client 131 is stored as "enabled" in the RAM (step S608; Yes), it is determined whether or not a fixed period has elapsed since the latest update of the RAM in step S605, or in other words, whether or not a fixed period has elapsed since the add-on 211 was last determined to be enabled (step S611).

If the fixed period has not elapsed (step S611; No), a response including content that does not include the substitute element 231 in place of the add-on 211 is generated (step S612), and the process advances to step S610.

If the fixed period has elapsed since the add-on 211 was last determined to be enabled (step S611; Yes), the add-on 211 in the browser on the client 131 is stored as "disabled" in the RAM (step S613), and the process advances to step S609.

With the above technique, a substitute element 231 is switched between being included or not in content provided to the client 131 according to a determination result of the server 101. However, as described above, it is also possible to modify the style of the substitute element 231 or the content of a JavaScript function associated with the substitute element 231. Alternatively, a instruction from the server 101 may be given to the add-on 211 or toolbar 221 of the client 131, or to a substitute element 231 already being displayed in the content area 241, so that the substitute element 231 stops processing and becomes invisible.

The second technique substantially determines whether an add-on is enabled/disabled in the client 131. In other words, the add-on handler 504 in the client 131 may execute either of the hiding configuration techniques (2) and (3) on a substitute element 231 that conducts a process similar to the add-on handler 504 itself.

Specifically, suppose that in a substitute element 231 included in content 153 generated by the server 101, the name of a process of the substitute element 231 or the name of an add-on 211 that executes a similar process is specified in a name attribute. If a specification is made in this way, the add-on 211 that is enabled in the browser on the client 131 is able to understand that an HTML element with the same name as the add-on 211 itself or an HTML element having a name of a process executed by the add-on 211 itself is a substitute element 231 that acts in place of the add-on 211 itself. Accordingly, the add-on 211 hides or deletes the substitute element 231 having the name associated with the add-on 211 itself.

In this way, if the add-on handler 504 is enabled, a process to hide the substitute element 231 is executed, whereas if the add-on handler 504 is disabled, the process to hide the substitute element 231 is not executed, and the substitute element 231 is still displayed.

With the second technique, the content 153 provided from the server 101 may be the same content irrespectively of whether or not the add-on 211 is installed and enabled in the browser on the client 131, thus potentially speeding up the content generation process.

In the above configuration, in the case in which a given add-on 211 is enabled in the browser, a substitute element 231 that acts in place of the add-on 211 is hidden or deleted from the content 153.

In the case in which multiple add-ons 211 are available on the toolbar 221, with some enabled and the rest disabled, only the substitute elements 231 that act in place of the add-ons 211 that are enabled are hidden or selectively deleted from the content 153.

However, by interpreting the entire toolbar 221 as a single add-on 211, and by interpreting substitute elements 231 corresponding to this add-on 211 as the floating header 241, the floating header 241 in content may also be hidden or deleted in a browser with the toolbar 221 installed and enabled, irrespectively of whether or not the add-on 211 within the toolbar 221 is used.

Also, in the case in which a portion of substitute elements 231 within the floating header 241 are still displayed, it is conceivable that the user may not consider that information as very important. Accordingly, one potential technique is to delete the "position:fixed" and the like in the placement style of the div element or the like constituting the floating header 241, and place the remaining substitute elements 231 inside the main content 243 or the sidebar 245 or the like. With this technique, the remaining substitute elements 231 are not displayed fixed at the top edge of the content area 205, but scroll outside the content area 205 in accordance with the user's scroll instructions. Consequently, the user is able to use the entire content area 205 to view the main content 243, the sidebar 245, and the like.

Meanwhile, as discussed earlier, an add-on 211 according to the present technique conducts a process that transmits a request 151 to the server 101 on the basis of a user instruction, or intermittently or periodically, acquires necessary data from the content 153 included in a response 155 to the request 151, and displays the data within the content area 244 or within an add-on 211 placed in the toolbar area 204. Furthermore, an add-on 211 according to the present technique processes the content 153 when the content 153 is to be displayed.

Figure 7:
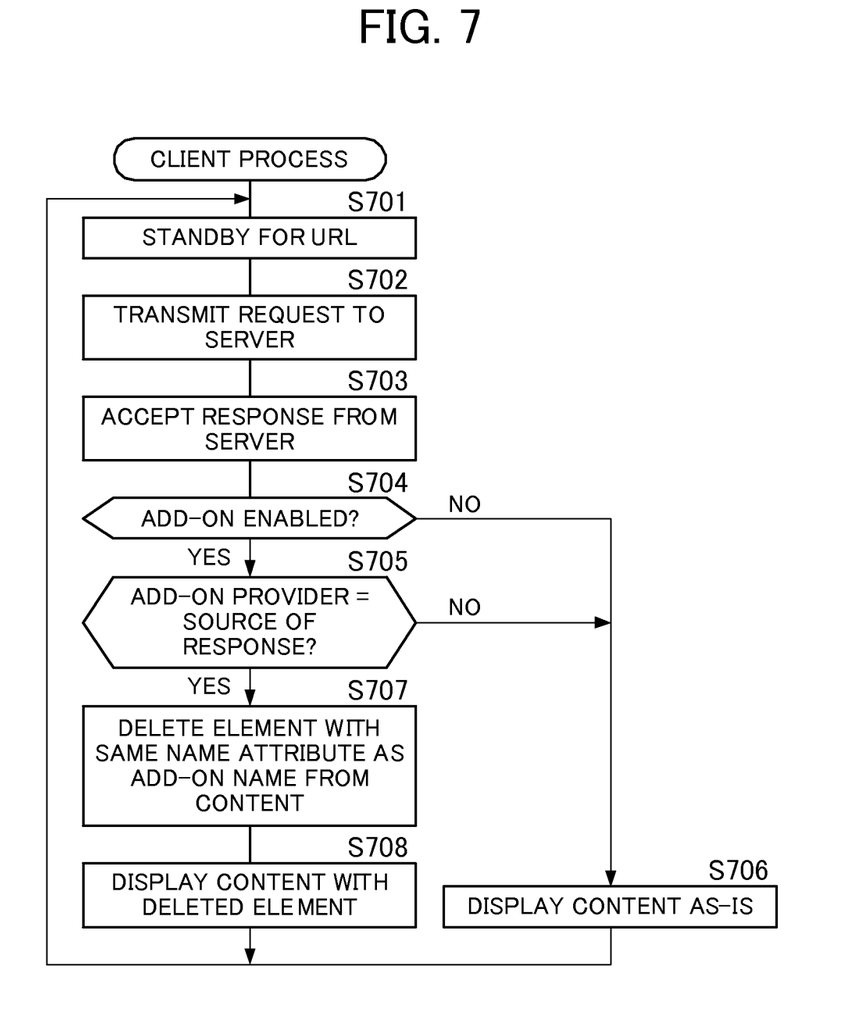

FIG. 7 is a flowchart illustrating a control flow of a client process executed by a client 131 running a browser with an enabled add-on 211 according to an example of the present technique. The description hereinafter will refer to this diagram.

The description of the present client process presupposes the case in which desired content is specified by a user operation.

First, the client 131 stands by until a desired URL is specified as a result of the user inputting into the address bar, selecting a link, or the like (step S701).

If a desired URL is specified, the requester 503 of the client 131 transmits a request 151 to the server 101 managing the URL (step S702).

Subsequently, the acceptor 501 then accepts a response 155 to the request 151 from the server 101 (step S703).

Upon receiving the response 155, the client 131 checks whether or not the add-on 211 is enabled in the browser (step S704).

If enabled (step S704; Yes), the add-on handler 504 checks whether or not the source of the response 155 matches the provider of the add-on 211 (step S705).

In the case of a non-match (step S705; No), the content 153 included in the received response 155 is displayed as-is in the content area 244 (step S706), and the process returns to step S701.

On the other hand, in the case of a match (step S705; Yes), the add-on handler 504 deletes from the received content 153 all elements having a designated name (such as the name of the add-on 211) in a name attribute (step S707).

The remaining content 153 after deletion is then displayed in the content area 244 (step S708), and the process returns to step S701.

Meanwhile, in the case in which the add-on 211 is disabled in the browser (step S704; No), the add-on handler 504 does not exist or function at all, and thus the process proceeds to step S706. For this reason, if the content 153 includes a substitute element 231, the substitute element 231 is displayed as-is in the content area 244.

Note that the processing in steps S703, S704, and S706 may also be executed due to the browser of the client 131 successively activating an add-on 211 reacting to an onLoad event from among installed add-ons 211.

As above, according to the present Embodiment, on the basis of whether an add-on 211 is enabled or disabled in a browser running on a client 131, the hiding or displaying of a substitute element 231 that fulfills a similar function as the add-on 211 is controlled when displaying content 153 in the content area 244 of the browser. Consequently, the user is less annoyed when viewing content, and becomes able to accurately grasp information from the add-on 211 and the content 153.

Embodiment 2

The present Embodiment relates to an innovation when searching for content with the search add-on 211b and the search substitute element 231b.

In the search add-on 211b and the search substitute element 231b disclosed in FIGS. 2 and 3 of the previous Embodiment, a drop-down box allowing selection of the search range is available in addition to the input of search keywords.

In the present embodiment, in the search add-on 211b and the search substitute element 231b, the choices for the search range applicable to a query are modified.

The server 101 is used to run an electronic marketplace in which multiple stores offer products, with each store creating and managing product description pages for each product. In this situation, the creators of the respective content 153 are the respective store owners. In addition, a substitute element 231a is an element included in the content 153 itself.

Consequently, it is also conceivable that the search range provided in the substitute element 231a should be a range within the scope of each store owner. In such an application, the available candidates in the search range drop-down box in the substitute element 231 conceivably should be the "entire Web", and "inside this store" providing the content 153.

On the other hand, since the search add-on 211b is installed in the browser according to the user's wishes, the provided search ranges are not limited to the above candidates. For example, on the basis of the user's viewing history, "inside Store A", "inside Store B", "inside Store C" and so on within the server 101 may also be made available as search range candidates.

Also, "similar stores" competing with the store providing the content 153 currently being displays may be made available as a search range candidate. Whether or not stores are similar may be arranged in advance according to factors such as the similarity of products that the stores handle.

With this configuration, if the search add-on 211b or a toolbar 221 including the search add-on 211b periodically or intermittently transmits a request 151 to the server 101, the server 101 specifies suitable search range candidates in the response 155, and informs the search add-on 211b.

Also, by having the search add-on 211b refer to the viewing history of the browser, it is possible to acquire "inside Store A", "inside Store B", "inside Store C" and so on within the server 101.

In the present embodiment, by diversifying the search range candidates available in the search add-on 211b versus the search range candidates available in the substitute element 231a, search is made more convenient for the user, encouraging usage of the toolbar 221 and the add-ons 211.

Embodiment 3

In the foregoing embodiments, in the case in which some of the add-ons 211 included in the toolbar 221 are enabled while the remaining the add-ons 211 are disabled, the substitute elements 231 that act in place of the remaining add-ons 211 are still displayed within the content 153.

Herein, an add-on 211 disabled by the user is an add-on 211 thought by the user to provide unwanted information when the user accesses a server 101 other than the provider of the toolbar 221.

However, in the foregoing embodiments, even if the user disables an add-on 211, if the server 101 of the provider of the toolbar 221 is accessed, the substitute element 231 that acts in place of the disabled add-on 211 will still be displayed within the content 153, and may decrease the amount of content that may be viewed at once.

Accordingly, in the present embodiment, while the user is accessing the server 101 of the provider of the toolbar 221 from the browser, even if an add-on 211 has been disabled by the user, if the content provided by the server 101 contains a substitute element 231 that acts in place of the disabled add-on 211, the substitute element 231 is deleted or hidden, and in addition, the disabled add-on 211 is temporarily enabled.

If the user leaves the server 101 of the provider of the toolbar 221, the temporary setting is cancelled, and the add-on 211 is disabled again as the user desires.

In the present embodiment, even if the user thinks that constantly receiving a service provided by the add-on 211 on the toolbar 221 is not necessary, if the content 153 provided by the server 101 of the provider of the toolbar 221 contains a substitute element 231 for the service, the substitute element 231 for the service is deleted, and the add-on 211 for the service is temporarily enabled. As a result, it becomes possible to potentially utilize the content area 205 more effectively.

In the Embodiment described above, add-ons 211 on the toolbar 221 may be enabled or disabled, and in the case in which the content 153 contains a substitute element 231 that acts in place of a disabled add-on 211, the substitute element 231 is deleted or hidden, and additionally, the disabled add-on 211 is temporarily enabled.

However, regarding the display of the toolbar 221 in the browser, if the number of add-ons 211 displayed grouped on the toolbar 221 increases, depending on the horizontal width of the browser screen 201, the toolbar 221 may be rearranged, and add-ons 211 within the toolbar 221 may also be rearranged, and thus the size of the content area 244 may vary.

Consequently, the amount of content 153 that is displayable in the content area 244 is calculated for:

(p) a situation in which disabled add-ons 211 remain disabled, and the substitute elements 231 that act in place of those disabled add-ons 211 remain within the content as-is; and (q) a situation in which disabled add-ons 211 are temporarily enabled, and the substitute elements 231 that act in place of those disabled add-ons 211 are deleted from the content or hidden.

In the situation (p), the displayable amount of content 153 refers to the result of subtracting the surface area of the floating header 241 from the surface area of the content area 244 when the disabled add-ons 211 remain disabled.

In the situation (q), the displayable amount of content 153 is the surface area of the content area 244 when the disabled add-ons 211 are temporarily enabled, and displayed within the toolbar area 204.

The surface area of the content area 244 may be calculated from an innerWidth attribute and an innerHeight attribute of the window in which content is being displayed, or from a clientWidth attribute and a clientHeight attribute of an in-browser object corresponding to displayed content. Also, the surface area of the floating header 241 may be calculated by referring to the CSS.

After obtaining the displayable amounts of content 153 in the situation (p) and the situation (q) in this way, if the amount in the situation (p) exceeds (is equal to or greater than) the amount in the situation (q), in order to be more useful for the user, and thus the corresponding substitute elements 231 are deleted or hidden, and additionally, the disabled add-ons 211 are temporarily enabled.

On the other hand, in the case in which the amount in the situation (p) is less than or equal to (below) the amount in the situation (q), the disabled add-ons 211 remain disabled, and the substitute elements 231 that act in place of the disabled add-ons 211 are left within the content as-is.

With this configuration, even in the case in which add-ons 211 are rearranged on the toolbar 221 so that the surface area of the toolbar area 204 and the content area 244 is changed, it is possible to suitably control the enabling/disabling of the add-ons 211 as well as the displaying/hiding of the substitute elements 231.

Meanwhile, in the above Embodiment, a process that temporarily enables an add-on 211 while deleting or hiding a substitute element 231 is conducted.

However, a configuration that reverses the process in the above Embodiment is also possible, so that the floating header 241 is placed within the content as-is, and the display of the toolbar 221 in the toolbar area 204 is temporarily suspended.

This configuration may be adopted in a browser in which, even in a situation where the toolbar 221 is not displayed in the toolbar area 204, the toolbar 221 senses the receiving of a response 155 in the background, identifies the source of the content, examines the content itself, communicates with the server 101, and configures itself to be displayed again in the toolbar area 204.

INDUSTRIAL APPLICABILITY

According to the present disclosure, it is possible to provide a server, a client terminal, a service method, and a program that appropriately controls the availability as well as the visibility of a browser add-on that executes a process utilizing a server, and an element which is included in content provided from the server and which executes the process.

REFERENCE SIGNS LIST

101 server
131 client
151 request
153 content
155 response
201 browser screen
202 address bar area
203 buttons
204 toolbar area
205 content area
211 add-on
221 toolbar
231 substitute element
241 floating header
243 main content
245 sidebar
247 banner ads
401 receiver
402 generator
403 transmitter
404 determiner
501 acceptor
502 display
503 requester
504 add-on handler

The invention claimed is:

1. A server comprising:
at least one memory operable to store program code; and
at least one processor operable to read the program code and operate as instructed by the program code, the program code including:
receiver code configured to cause at least one of said at least one processor to receive, at the server, a request transmitted from a browser running on a client, wherein the client includes at least one display configured to display the browser;
generator code configured to cause at least one of said at least one processor to generate a response including content according to the received request;
transmitter code configured to cause at least one of said at least one processor to transmit, from the server, the generated response to the browser; and
determiner code configured to cause at least one of said at least one processor to determine from the received request whether an add-on that executes a process in the browser is enabled or disabled in the browser, wherein
after determining that the add-on is disabled in the browser, the generator code is further configured to cause the at least one of said at least one processor to generate the content so that a substitute element that executes the process in place of the add-on in the browser is displayed in a content area of the browser on the at least one display, and
after determining that the add-on is enabled in the browser, the generator code is further configured to cause the at least one of said at least one processor to, in order to avoid a decrease in an amount of content that a user is able to view in the content area without scrolling, generate the content so that the substitute element is not displayed in the content area of the browser on the at least one display, wherein
the substitute element and the add-on execute a similar process and the substitute element and the add-on provide a similar service to the user.

2. The server according to claim 1, wherein
by execution of the process, the browser receives a query from the user of the browser, transmits a request including the query to the server, receives a response including a search result for the query from the server, and displays the search result in the content area of the browser,
during execution of the process by the substitute element, the query is received from an input area of the substitute element placed in the content area, and during execution of the process by the add-on, the query is received from an input area of the add-on placed in an add-on area of the browser.

3. The server according to claim 1, wherein
the server provides content related to an electronic marketplace that a plurality of stores participate in,
wherein the substitute element is configured to provide a first query to the browser, and wherein a first search range of the first query is limited to a first store, wherein the first store is a provider of the first content currently being displayed in the content area, and
wherein the add-on is configured to provide a second query to the browser, and wherein a second search range of the second query includes the first store and a second store, wherein the add-on is configured to provide the second store based on a viewing history of the user.

4. The server according to claim 1, wherein
by execution of the process, the browser intermittently transmits a request including identification information that identifies the user of the browser, receives a response including user information related to the identification information from the server, and displays the user information,
during execution of the process by the substitute element, the user information is displayed in a display area of the substitute element placed in the content area of the browser, and
during execution of the process by the add-on, the user information is displayed in a display area of the add-on placed in an add-on area of the browser.

5. The server according to claim 1, wherein
a plurality of processes are executable in the browser,
each of the plurality of processes is executed by each of a plurality of add-ons as well as each of a plurality of substitute elements that act in place of the plurality of add-ons,
among the plurality of add-ons, an add-on enabled in the browser is displayed grouped in an add-on area of the browser, and
among the plurality of elements, a substitute element that acts in place of an add-on disabled in the browser is displayed grouped at a designated position in the content area.

6. The server according to claim 5, wherein
when the plurality of add-ons includes an add-on that is enabled in the browser and an add-on that is disabled in the browser, by instruction of the user, a setting element that sets to the add-on to enable a disabled add-on in the browser is grouped together with a substitute element that acts in place of an add-on that is disabled in the browser.

7. The server according to claim 1, wherein
the determiner code is further configured to cause at least one of said at least one processor to determine that the add-on is enabled in the browser when the add-on is specified as request source information in the received request.

8. A client running a browser having an enabled add-on that executes a process using a server, comprising:
at least one display configured to display the browser;
at least one memory operable to store program code; and
at least one processor operable to read the program code and operate as instructed by the program code, the program code including:
acceptor code configured to cause at least one of said at least one processor to accept content transmitted from the server; and
display code configured to cause at least one of said at least one processor to:
determine that a substitute element is included in the accepted content, and, in order to avoid a decrease in an amount of content that a user is able to view in a content area without scrolling, hide the substitute element by setting a display attribute to none, wherein the substitute element and the add-on execute a similar process and the substitute element and the add-on provide a similar service to the user.

9. The client according to claim 8, wherein
in a case where the add-on is operably installed in the browser but is set to be disabled, when the content is received from the server, the add-on is set to be enabled, and when other content is received from other server, the add-on is set to be disabled again.

10. The client according to claim 8, wherein
in a case where a plurality of add-ons are installed in the browser, but include an add-on that is set to be enabled and an add-on that is set to be disabled,
when an amount of content other than the substitute element that is displayable in the content area when the disabled add-on is enabled and the substitute element is not displayed is equal to or greater than an amount of content other than the substitute element that is displayable in the content area when the disabled add-on is disabled and the substitute element is displayed,
the disabled add-on is set to be enabled in the browser.

11. The client according to claim 8, wherein
in a case where a plurality of add-ons are installed in the browser, but include an add-on that is set to be enabled and an add-on that is set to be disabled,
when an amount of content other than the substitute element that is displayable in the content area when the enabled add-on is disabled and the substitute element is displayed
is equal to or greater than an amount of content other than the substitute element that is displayable in the content area when the enabled add-on is enabled and the substitute element is not displayed,
the enabled add-on is set to be disabled in the browser.

12. A service method performed by a server, the service method comprising:
receiving, at the server, a request transmitted from a browser running on a client, wherein the client includes at least one display configured to display the browser;
generating, at the server, a response including content according to the received request;
transmitting, from the server, the generated response to the browser; and
determining from the received request, at the server, whether an add-on that executes a process in the browser is enabled or disabled in the browser, wherein
after determining that the add-on is disabled in the browser, generating the content, at the server, so that a substitute element that executes the process in place of the add-on in the browser is displayed in a content area of the browser on the at least one display, and
after determining that the add-on is enabled in the browser, generating, at the server, the content so that the substitute element is not displayed in the content area of the browser on the at least one display.

13. A non-transitory recording medium on which a program is recorded, the program causing a computer comprised in a server to:
  receive, at the server, a request transmitted from a browser running on a client, wherein the client includes at least one display configured to display the browser;
  generate, at the server, a response including content according to the received request;
  transmit, from the server, the generated response to the browser; and
    determine, at the server, from the received request whether an add-on that executes a process in the browser is enabled or disabled in the browser, wherein a substitute element and the add-on execute a similar process and the substitute element and the add-on provide a similar service to the user, and wherein
  after determining that the add-on is disabled in the browser, generate, at the server, the content so that a substitute element that executes the process in place of the add-on in the browser is displayed in a content area of the browser on the at least one display, and
  after determining that the add-on is enabled in the browser, generate, at the server in order to avoid a decrease in an amount of content that a user is able to view in the content area without scrolling, the content so that the substitute element is not displayed in the content area of the browser on the at least one display.

* * * * *